United States Patent
Ito et al.

(10) Patent No.: US 7,222,397 B2
(45) Date of Patent: May 29, 2007

(54) CLAMPING BAND

(75) Inventors: Naoki Ito, Chino (JP); Kazuhiro Fujimori, Chino (JP); Takeo Yamamoto, Toyota (JP); Hiroyuki Takigami, Toyota (JP); Osamu Takeuchi, Toyota (JP)

(73) Assignees: Kabushiki Kaisha Mihama, Nagano (JP); Toyota Jidosha Kabushiki Kaisha, Aichi (JP)

( * ) Notice: Subject to any disclaimer, the term of this patent is extended or adjusted under 35 U.S.C. 154(b) by 84 days.

(21) Appl. No.: 11/212,053

(22) Filed: Aug. 25, 2005

(65) Prior Publication Data
US 2006/0117533 A1 Jun. 8, 2006

(30) Foreign Application Priority Data
Dec. 3, 2004 (JP) .............................. 2004-350683

(51) Int. Cl.
*B65D 63/00* (2006.01)
(52) U.S. Cl. .......................... 24/273; 24/20 R; 285/420

(58) Field of Classification Search ................ 285/420, 285/252; 24/20 R, 20 CW, 23 R, 22, 24, 24/23 W, 23 B, 23 EE, 20 TT, 273, 271
See application file for complete search history.

(56) References Cited

U.S. PATENT DOCUMENTS

| | | | | | |
|---|---|---|---|---|---|
| 987,230 | A | * | 3/1911 | Hoover | 24/20 TT |
| 2,654,926 | A | * | 10/1953 | Delafosse | 24/16 R |
| 3,276,089 | A | * | 10/1966 | Cheever et al. | 285/409 |
| 3,797,077 | A | * | 3/1974 | Omori et al. | 24/273 |
| 4,701,982 | A | * | 10/1987 | Matsuno et al. | 24/273 |
| 4,939,822 | A | * | 7/1990 | Henn | 24/271 |
| 5,044,814 | A | * | 9/1991 | Hama | 403/290 |
| 5,581,851 | A | * | 12/1996 | Nagano | 24/20 R |

* cited by examiner

*Primary Examiner*—David Bochna
(74) *Attorney, Agent, or Firm*—Jordan and Hamburg LLP

(57) ABSTRACT

The clamping band is capable of reducing a diameter with an ordinary tool or without the tool and improving working efficiency of clamping object members. The clamping band comprises: a first hook including a first projection, which can be engaged with the tool, and a second projection, which prevents rotation of a ring-shaped band member when a lever is pressed onto an external member; a second hook for engaging with the tool, the second hook being outwardly projected from the band member and located close to a position on which the lever is laid; and a clipping member for clipping and holding the lever in a laid state, the clipping member being located close to buckles.

5 Claims, 7 Drawing Sheets

CLAMPING BAND

BACKGROUND OF THE INVENTION

The present invention relates to a clamping band for clamping, for example, a boot covering a constant velocity joint of a vehicle, more precisely relates to a clamping band, which is capable of reducing a diameter of a ring-shaped band member by turning a lever, which is fixed to an connected end part of the band member, about one end as a fulcrum point until the other end thereof contacts an outer circumferential face of the band member.

For example, boots covering constant velocity joints of vehicles are clamped by various types of clamping bands. Especially, by using an end-connection type clamping band, a height of a clamped part, which has been plastic-deformed, can be lowered. The end-connection type clamping band is disclosed in Japanese Utility Model Gazette No. 55-109106. The end-connection type clamping band has a ring-shaped metallic band member, whose ends are connected, and a lever fixed to one side face of the connected part. A boot is clamped with the clamping band by the steps of: making one end of the lever contact the band member; turning the lever about the one end until the other end of the lever overlaps an outer circumferential face of the band member; and fixing the lever with buckles. By turning the lever, a diameter of the ring-shaped band member can be reduced, so that the boot can be clamped.

To fix the lever on the outer circumferential face of the band member, firstly the lever is engaged with an engaging section of the band member, then the buckles are bent so that the lever can be fixed thereon. The buckles are bent by, for example, a hammer in a state of laying the lever on the band member. However, lift of the lever, which is caused by elasticity of the lever, must be restrained so as to easily fix the lever. For example, the lever is turned by a special tool, then a worker releases the tool and takes the hammer to bend the buckles. These works are troublesome and inefficient, and restraining the lift of the lever is difficult. Further, production costs must be increased. Therefore, it is unsuitable to employ the end-connection type clamping bands as supplemental parts.

Further, the band member should be easily welded and should have high durability, so it is made of, for example, ferritic stainless steel. However, elasticity of ferritic stainless steel is low, so it is unsuitable for ferritic stainless steel to use as a material of elastic engaging parts. For example, in case of providing engaging claws, which temporarily hold the lever laid on the band member, to the both side edges of the band member with a short distance, the lever pushes the engaging claws to widen the distance therebetween when the lever is overlapped on the band member, but the distance is not elastically shortened so that the lift or the return of the lever cannot be prohibited.

SUMMARY OF THE INVENTION

The present invention has been invented to solve the disadvantages of the conventional clamping band.

An object of the present invention is to provide a clamping band capable of reducing a diameter with an ordinary tool or without the tool and improving working efficiency of clamping object members.

To achieve the object, the present invention has following structures.

Namely, the clamping band comprises:

a band member having a first end and a second end, which are connected to form said band member into a ring-shape;

a lever having one end, a mid part and the other end, the lever being fixed to the connected part of the band member at the mid part, in which the lever is turned about the one end, which contacts the band member as a fulcrum point, until the other end contacts an outer circumferential face of the ring-shaped band member so as to reduce a diameter of the ring-shaped band member;

buckles for holding the lever which has been turned and laid on the outer circumferential face of the ring-shaped band member, the buckles being respectively extended from both side edges of the band member;

a first hook including a first projection, which can be engaged with a tool, and a second projection, which prevents rotation of the ring-shaped band member when the lever is pressed onto an external member, in which the first projection and the second projection are outwardly projected from the lever, and they are arranged in that order toward the other end of the lever;

a second hook for engaging with the tool, the second hook being outwardly projected from the band member and located close to a position on which the lever is laid; and a clipping member for clipping and holding the lever in a laid state, the clipping member being located close to the buckles.

In the clamping band, the first hook of the lever may be located close to the connected part of the band member, and the second hook may be located close to the buckles.

In the clamping band, the position of the first hook may define a welding point of the band member and the lever, and the position of the second hook may define a position of the other end of the lever which has been laid on the band member so as to reduce the diameter thereof.

In the clamping band, the band member may be made of ferritic stainless steel, and the clipping member may be made of austenitic stainless steel.

In the clamping band, a distance between inner faces of the buckles may be gradually made longer than a width of the band member toward front ends of the buckles.

In the clamping band of the present invention, the first projection and the second projection are formed, in first hook of the lever, in that order, and the second hook is outwardly projected and located close to the position on which the lever is laid. In the state of temporarily bending the lever, the diameter of the band member can be reduced by mutually drawing the first hook and the second hook, with which the too is engaged, or rolling the band member with pressing the lever onto the outer circumferential face of the band member. The lever, which has been laid on the outer circumferential face of the band member, can be securely clipped by the clipping member, so that the lever can be easily fixed by bending the buckle after the diameter reduction. Therefore, working efficiency can be improved, and the clamping bands can be provided as supplemental parts.

If the first hook of the lever is located close to the connected part of the band member and the second hook is located close to the buckles, a distance between the one end of the lever, which acts as the fulcrum point, and the first hook can be short, so that moment working to the fulcrum point can be reduced and buckling of the lever can be prevented.

When the lever is pressed onto the outer circumferential face of the band member without tool, the first projection acts as the fulcrum point, so that the lever action promotes to press the lever and the lever can be received by the clipping member in an early stage of rolling the band member. With this action, the lever can be temporarily held by the clipping member even if the lever is short, so that buckling of the lever can be prevented. Further, the first projection firstly contacts the external member, then the second projection secondly contacts the same. The second projection prevents the rotation of the band member so as to prevent the buckles and the clipping member from damage and deformation.

If the position of the first hook defines the welding point of the band member and the lever and the position of the second hook defines the position of the other end of the lever which has been laid on said band member so as to reduce the diameter thereof, varying the positions of the first hooks and the second hooks of products can be prevented. Namely, the clamping bands having same quality can be mass-produced with low production costs.

If the band member is made of ferritic stainless steel, and the clipping member is made of austenitic stainless steel, even if the clipping member is temporarily deformed by turning the lever, the clipping member returns to the initial state, so that the elastic return of the lever can be securely prohibited.

Since the distance between the inner faces of the buckles is gradually made longer than the width of the band member toward the front ends of the buckles, the lever can be securely introduced into a space between the buckles even if the lever is moved sideward when the lever is turned by tool.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

A clamping band of the present embodiment has a ring-shaped band member, whose a first end and a second end connected each other, and a lever fixed to the connected part of the band member. The lever is turned until the lever contacts an outer circumferential face of the band member so as to reduce a diameter of the band member, so that the clamping band can clamp a member to be clamped. Note that, the clamping band of the present embodiment is used for clamping a plastic boot covering a constant velocity joint of a vehicle. The clamping bands can be supplied as supplemental parts.

A structure of the clamping band will be explained with reference to FIGS. 1 and 2.

Figure 1:
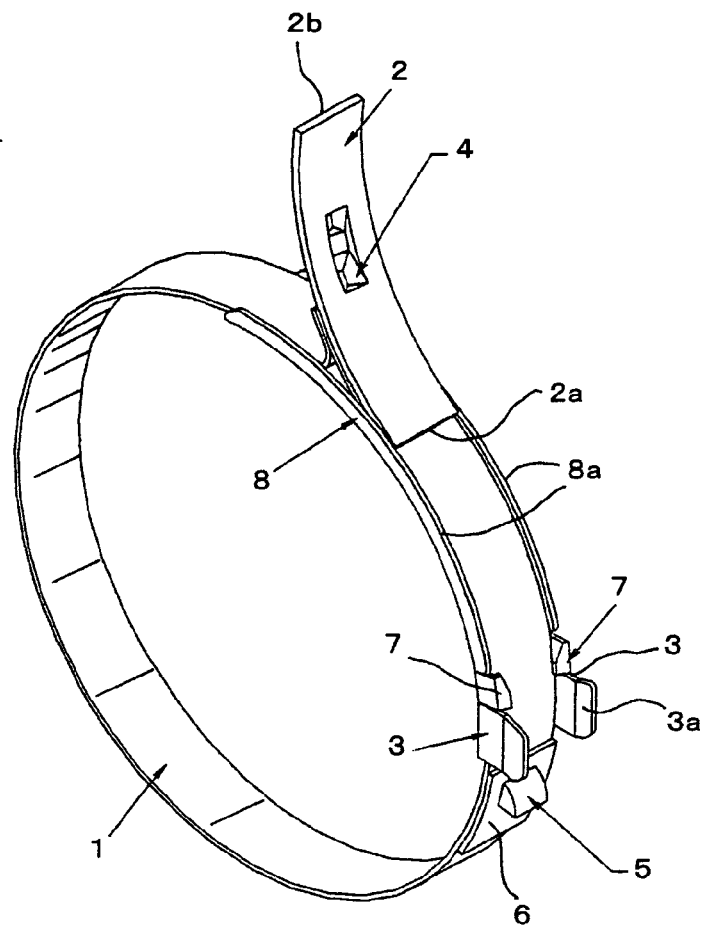
FIG. 1 is a perspective view of an unused clamping band of an embodiment of the present invention.
Figure 2:
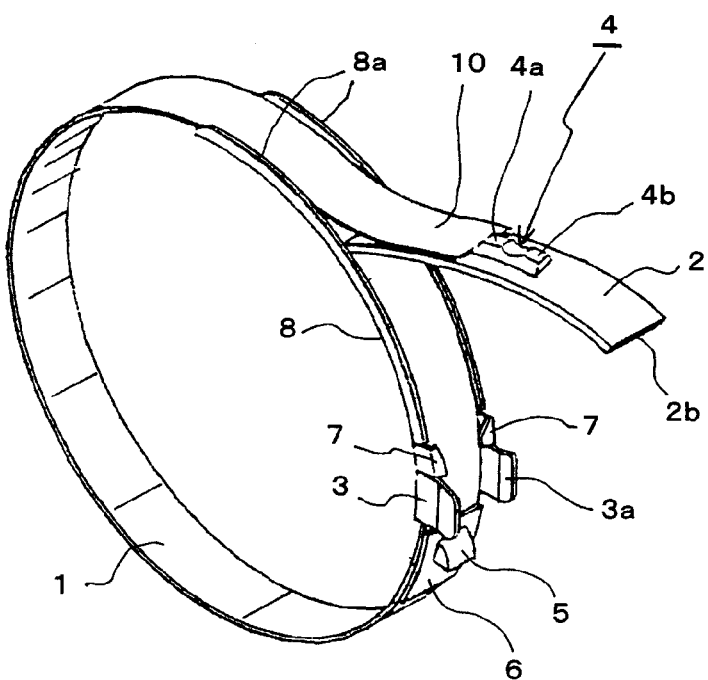
FIG. 2 is a perspective view of the clamping band whose lever is temporarily turned.

In FIGS. 1 and 2, both ends of a ring-shaped band member 1 are overlapped and connected, and a mid part of a lever 2 is fixed to the connected part 10 of the band member 1 by resistance welding. When a diameter of the band member 1 is reduced, the lever 2 is turned about one end 2a, which contacts the band member 1 and acts as a fulcrum point, until the other end 2b of the lever 2 reaches an outer circumferential face of the band member 1. The buckles 3, which are vertically extended from both side edges of the band member 1, are bent onto the lever 2, which has been laid on the outer circumferential face of the band member 1, so that the lever 2 can be fixed thereon. The band member 1 is made of a material which is easily welded and has high corrosion resistance, e.g., ferritic stainless steel (SUS 430).

The lever 2 is an arc-shaped metal plate, and its projected side is fixed to one side of the connected part 10 of the band member 1. A first hook 4 is outwardly projected from the lever 2. To form the first hook 4, a part of the metal plate is outwardly projected by a press machine. As shown in FIG. 2, the first hook 4 includes: a first projection 4a, which is capable of engaging with a tool toward the end 2b of the lever 2; and a second projection 4b, which is capable of limiting rotation of the band member 1 when the lever 2 is pressed onto an external member. The first projection 4a and the second projection 4b are formed in that order toward the end 2b. The first hook 4 is located close to the connected part 10 of the band member 1. A position of welding the lever 2 to the connected part 10 of the band member 1 is defined by the position of the first hook 4, so that production efficiency of the clamping bands can be improved. A second hook 5 is located close to the buckles 3, which will be overlapped on the turned lever 2, and outwardly projected from the band member 1. The second hook 5 is formed by outwardly projecting a part of an arc-shaped metal plate 6 by a press machine. The meal plate 6 is fixed to the band member 1 by resistance welding. Note that, the second hook 5 may be formed by outwardly projecting a part of the band member 1 by a press machine. Since the position of the second hook 5 defines the position of the front end 2b of the lever 2 which has reduced the diameter of the band member 1, varying the positions of the first hooks 4 and the second hooks 5 of products can be prevented. Namely, the clamping bands having same quality can be mass-produced with low production costs.

The buckles 3 are respectively vertically extended from the both side edges of the band member 1. By bending the buckles 3 inward, the lever 2, which has been laid on the outer circumferential face of the band member 1, can be fixed thereon. A distance between inner faces 3a of the buckles 3 is gradually made longer than a width of the band member 1 toward front ends of the buckles 3. Namely, the inner faces 3a are slope faces. Clipping members 7 are located close to the buckles 3 and on the lever 2 side With respect to the buckles 3. The clipping members 7 are also respectively vertically extended from the both side edges of the band member 1. The clipping members 7 prohibit elastic lift or return of the lever 2, which has been laid between the buckles 3. In the present embodiment, the buckles 3 and the clipping members 7 are fixed to the band member 1 by resistance welding, but they may be integrated with the band member 1. Preferably, the clipping members 7 are made of a material having superior elasticity, e.g., austenitic stainless steel (SUS 304).

A plate 8, which has a U-shaped section, is fixed on an inner circumferential face of the band member 1. The plate 8 corresponds to the connected part 10 of the band member 1, and one end of the plate 8 is fixed to the inner circumferential face by resistance welding. With this structure, the plate 8 covers a gap, which is formed between the both ends of the band member 1 and appeared on the inner side thereof, removes gaps between the band member 1 and the member to be clamped, and reinforces a part of the band member 1, to which loads are concentrated as the fulcrum point when the lever 2 is turned. Both extended sections 8a of the plate 8 act as guides for laying the lever onto the band member 1. In the present embodiment, the plate 8, the clipping members 7, the buckles 3 and the second hook 5 are fixed to the band member 1 in that order from the connected part 10 of the band member 1. Note that, in some cases, the plate 8 may be omitted.

Figure 3:
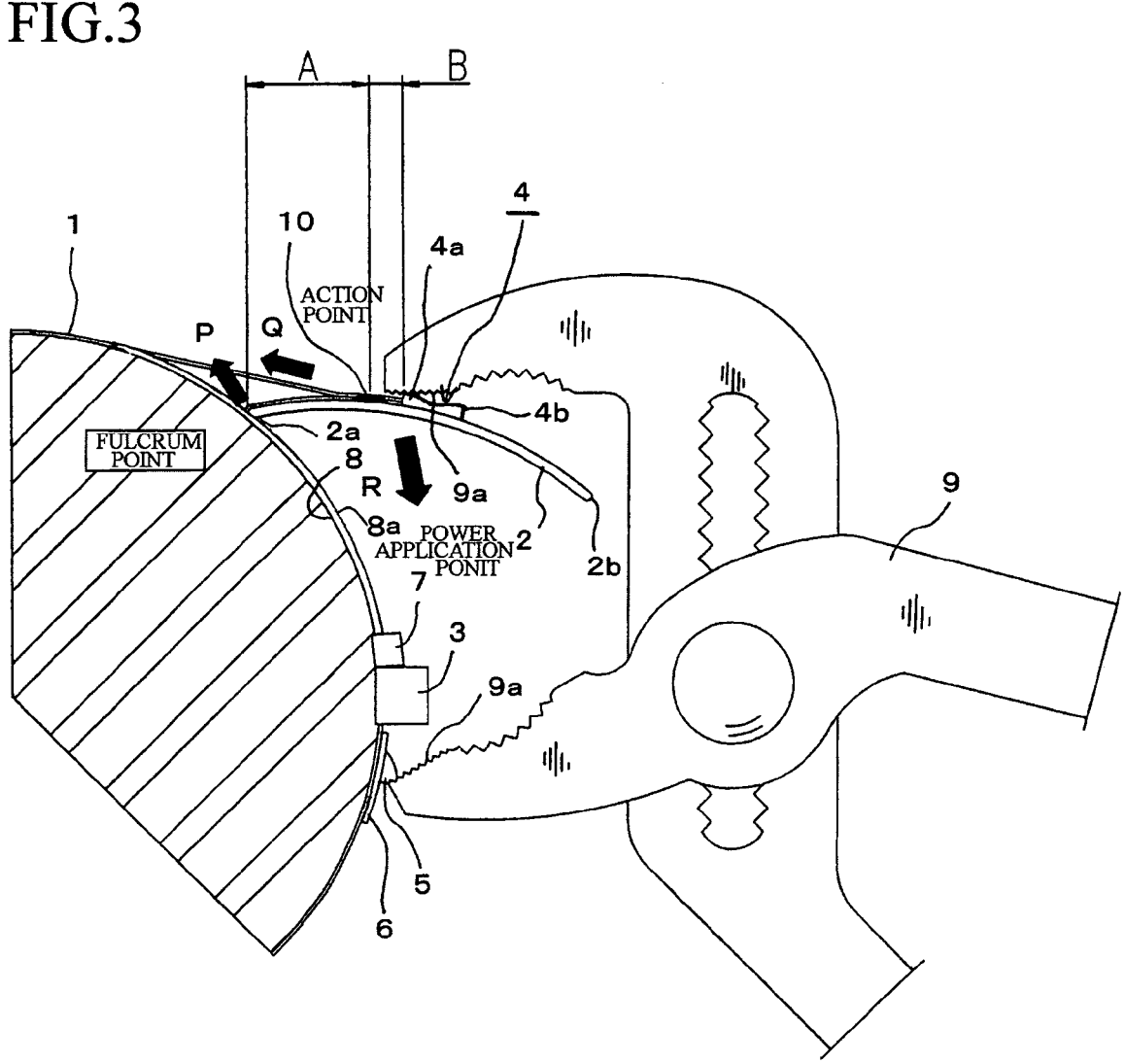
FIG. 3 is an explanation view of reducing a diameter of a band member with a tool.

The lever 2 must be temporarily bent from an initial position shown in FIG. 1 to a risen position shown in FIG. 2. Since the connected part 10 of the band member 1 is long enough and the band member 1 is made of a thin material (thickness: 0.2–0.5 mm), the lever 2 can be easily temporarily turned by hands. As shown in FIG. 3, engage sections 9a of a tool 9, e.g., pliers, are respectively engaged with the first projection 4a of the first hook 4 of the lever 2, which has been temporarily risen with respect to the band member 1, and the second hook 5 of the band member 1.

Now, the relationship between the first hook 4 of the lever 2 and the second hook 5 of the band member 1 will be explained with reference to FIGS. 3–5. In FIG. 3, the lever 2, which has been turned about the end 2a as the fulcrum point and temporarily bent, is turned, by the tool 9, toward the band member 1. At that time, forces P, Q and R respectively work to the end (the fulcrum point) 2a, the connected part (an action point) 10 and the first projection (a power application point) 4a when a force F is applied to the first projection 4a. A distance between the fulcrum point 2a and the connected part 10 is A, and a distance between the connected part 10 and the first projection 4a is B. Therefore, a moment of force working to the fulcrum point 2a is F×(A+B). Since amount or reducing the diameter correlative to the diameter of the band member 1, the distance A cannot be changed. On the other hand, the distance B can be shortened if the first hook 4 is located close to the connected part 10, further the moment of force working to the fulcrum point 2a can be smaller by shortening the lever 2, so that the lever 2 can be securely laid without buckling.

Figure 4:
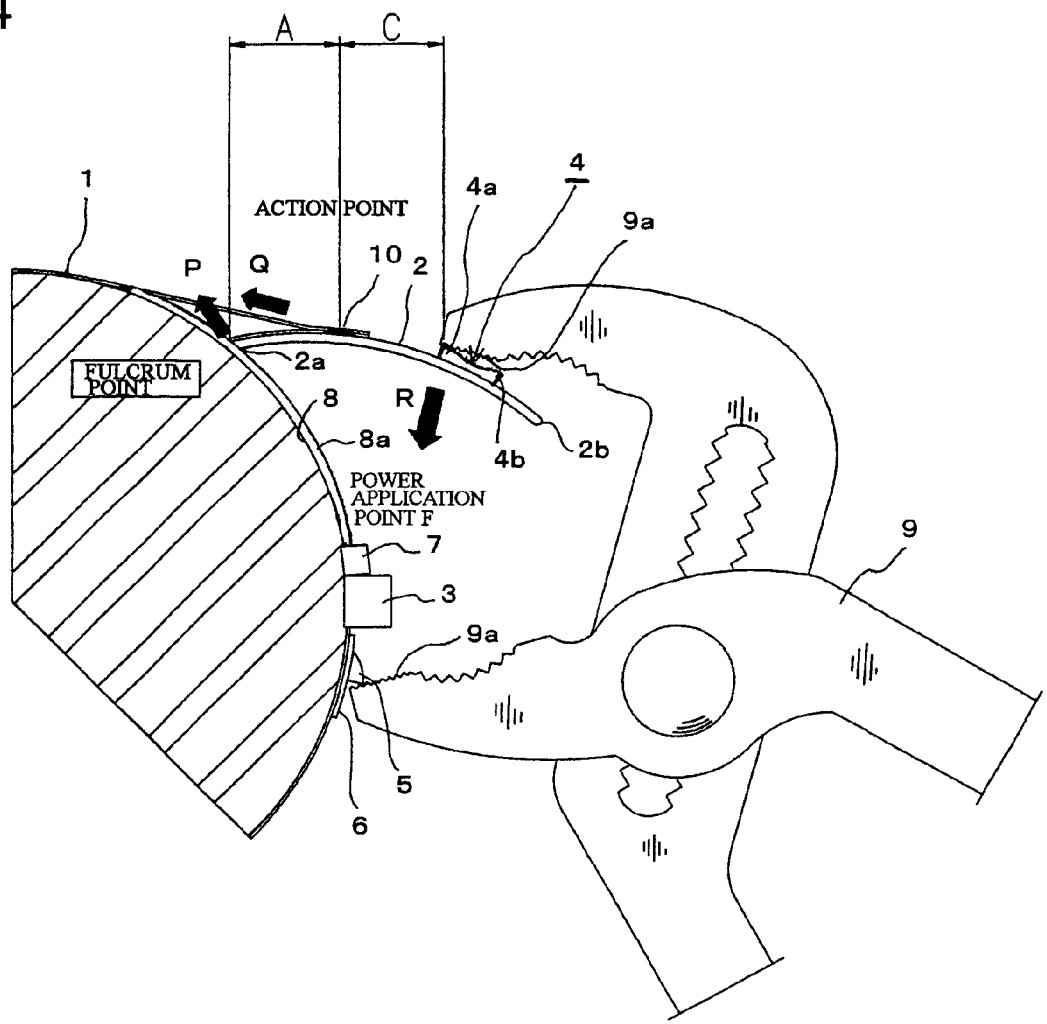
FIG. 4 is an explanation view of reducing a diameter of another band member with the tool.
Figure 5:
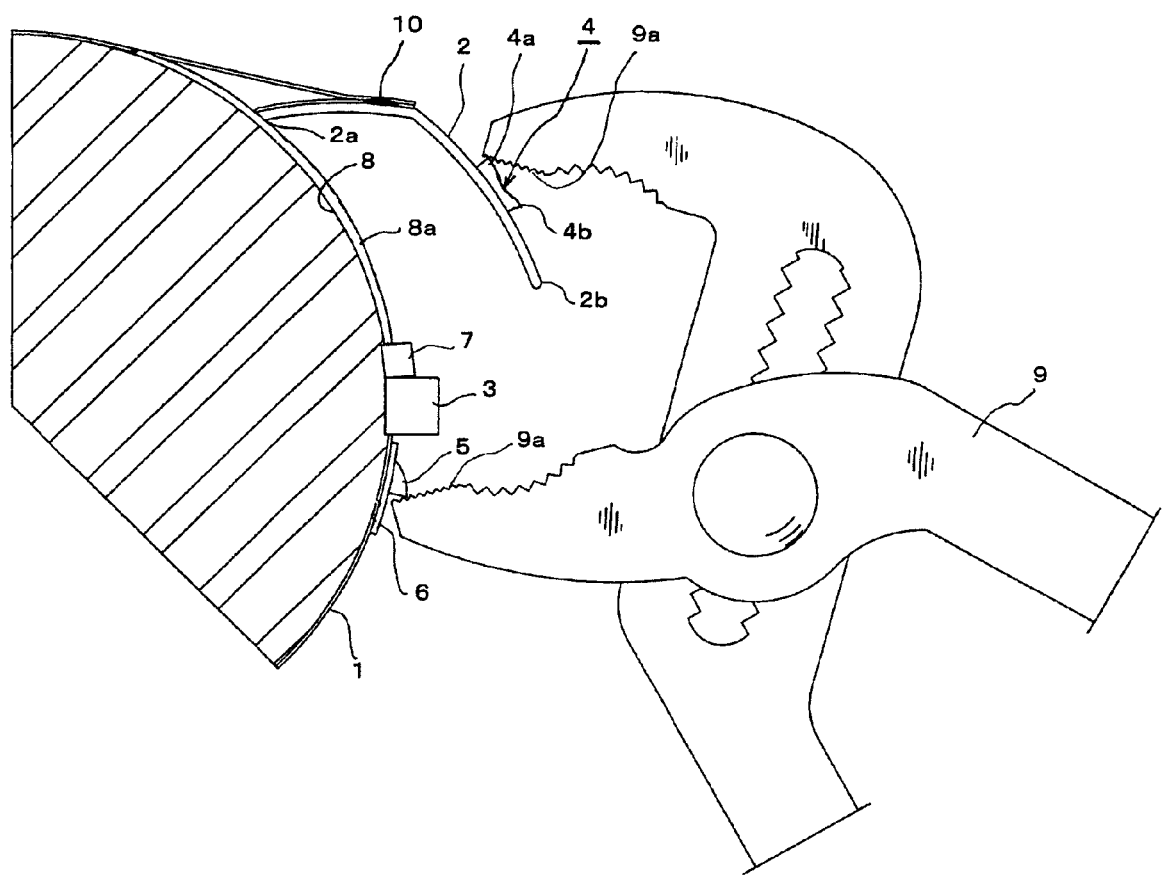
FIG. 5 is an explanation view of a defect caused by the structure shown in FIG. 4.

A comparative example is shown in FIG. 4. In FIG. 4, the first hook 4 is located closer to the end 2b of the lever 2. A clamp width of the tool 9 is narrower, so that the lever 2 can be easily turned. However, the moment of force working to the fulcrum point 2a is F×(A+C). Note that, C is the distance between the connected part 10 and the first projection 4a. Since C>B, the moment of force working to the fulcrum point 2a shown in FIG. 4 is greater than that shown in FIG. 3. Therefore, buckling occurs at the front end 2b of the lever 2 as shown in FIG. 5. If a distance between the second hook 5 of the band member 1 and the buckles 3 is long, the clamp width of the tool 9 is wide. It is difficult to clamp with the ordinary tool 9. Preferably, the hook 5 is located close to the buckles 3.

Next, the steps of attaching the clamping band with the tool 9 will be explained with reference to FIGS. 6A–6E and 7. Note that, in FIG. 7, the clamping band is attached to a plastic boot 12, which covers a constant velocity joint 11 connected to a drive shaft of a vehicle.

Figure 6:
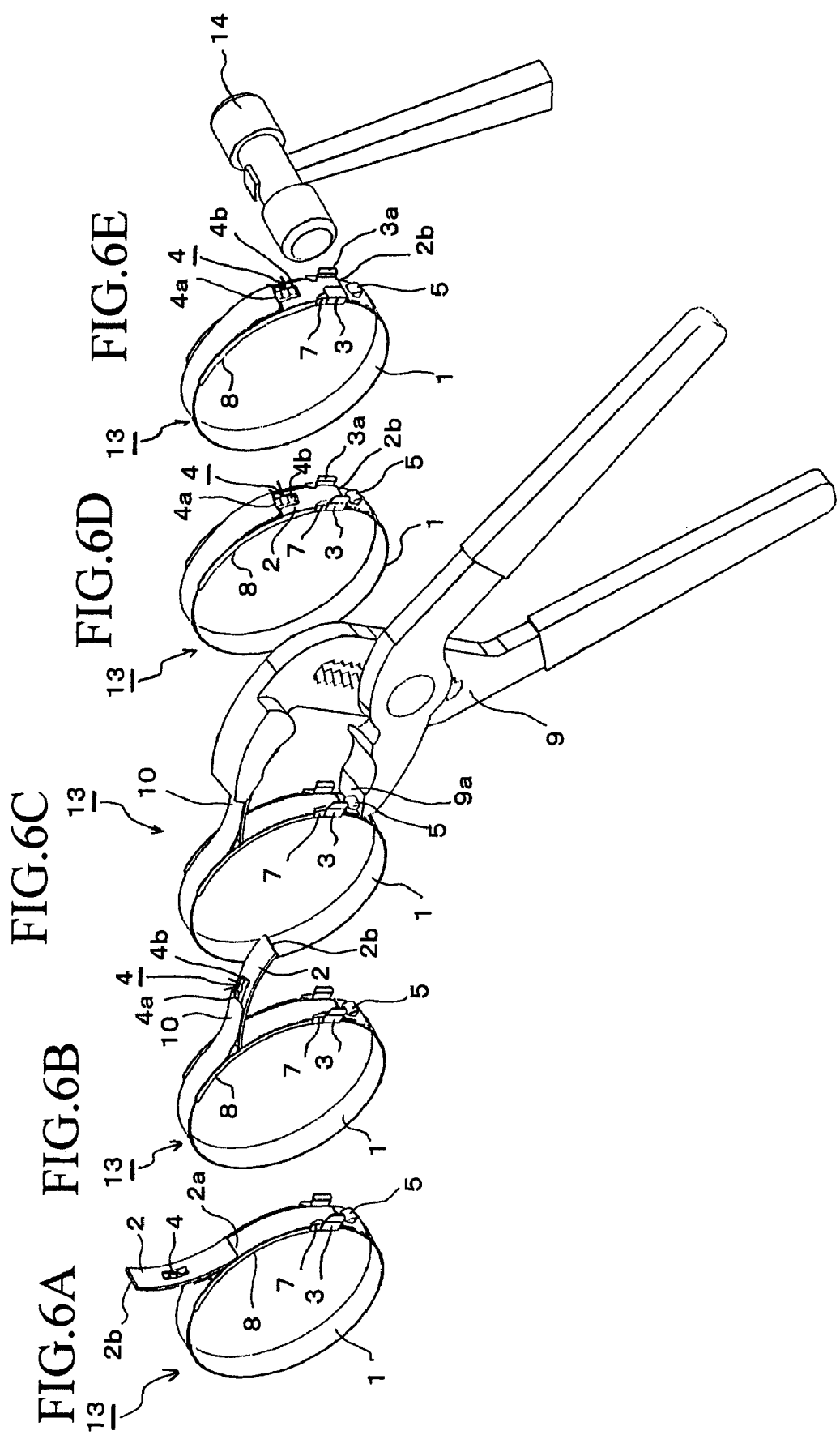
FIGS. 6A–6E are explanation views showing the steps of attaching the clamping band.

The constant velocity joint 11 has been previously covered with the plastic boot 12. The clamping band 13 is set on an outer circumferential face of the boot 12 (FIG. 6A). Then, the lever 2 is temporarily bent until reaching the risen position (FIG. 6B). The first hook 4 of the lever 2 and the second hook 5 of the band section 5 are engaged with the engage sections 9a of the tool 9 so as to clamp (FIG. 6C). By clamping with the tool 9, the lever 2 is turned and laid on the outer circumferential face of the band member 1, and the front end 2b of the lever 2 is located between the buckles 3 (FIG. 6D). With this action, the diameter of the band member 1 can be reduced. At that time, the front end 2b of the lever 2 attempts to lift upward by its elasticity, but the clipping members 7 prohibits the lift. Since the clipping members 7 are made of spring steel, the clipping members 7 can return to initial states even if the clipping members 7 are temporarily deformed sideward when the lever 2 is laid onto the band member 1. Therefore, the lever 2 can be securely engaged with the clipping members 7.

Figure 7:
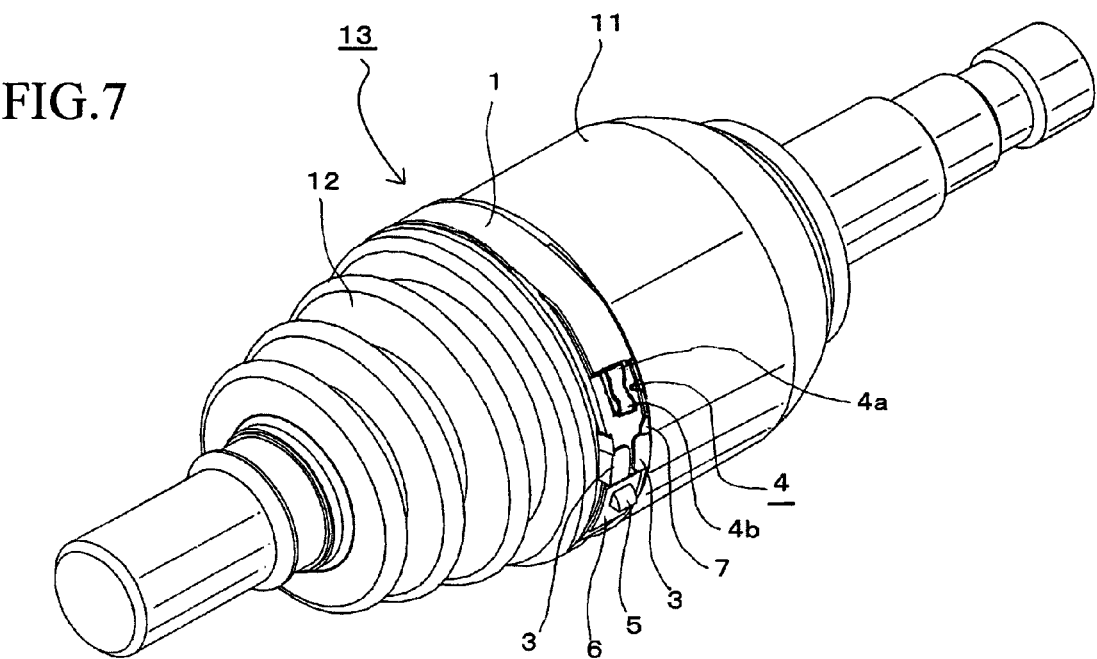
FIG. 7 is a perspective view of a constant velocity joint, which is clamped by the clamping band.

Finally, the buckles 3 are bent inward so as to hold the front end 2b of the lever 2 by a hammer 14, so that the clamping band 13 clamps the boot 12 (FIG. 6E). When the buckles 3 are bent, the front end 2b of the lever 2 is temporarily held by the clipping members 7, so the buckles 3 can be easily bent. The clamping band 13 completely attached to the boot 12 is shown in FIG. 7. Since an outer face of the lever 2 is pressed or held by the buckles 3 and the clipping members 7, a height of a clamping part can be low, so that the clamping band 13 never interferes with the boot 12 and can securely seal the boot 12.

Successively, another method of attaching the clamping band 13 without using the too 9 will be explained with reference to FIGS. 6A–6E, 8 and 9. In this embodiment too, the clamping band 13 is attached to the plastic boot 12, which covers the constant velocity joint 11 connected to the drive shaft of the vehicle.

The constant velocity joint 11 has been previously covered with the plastic boot 12. The clamping band 13 is set on an outer circumferential face of the boot 12 (FIG. 6A). Then, the lever 2 is temporarily bent until reaching the risen position (FIG. 6B).

Figure 8:
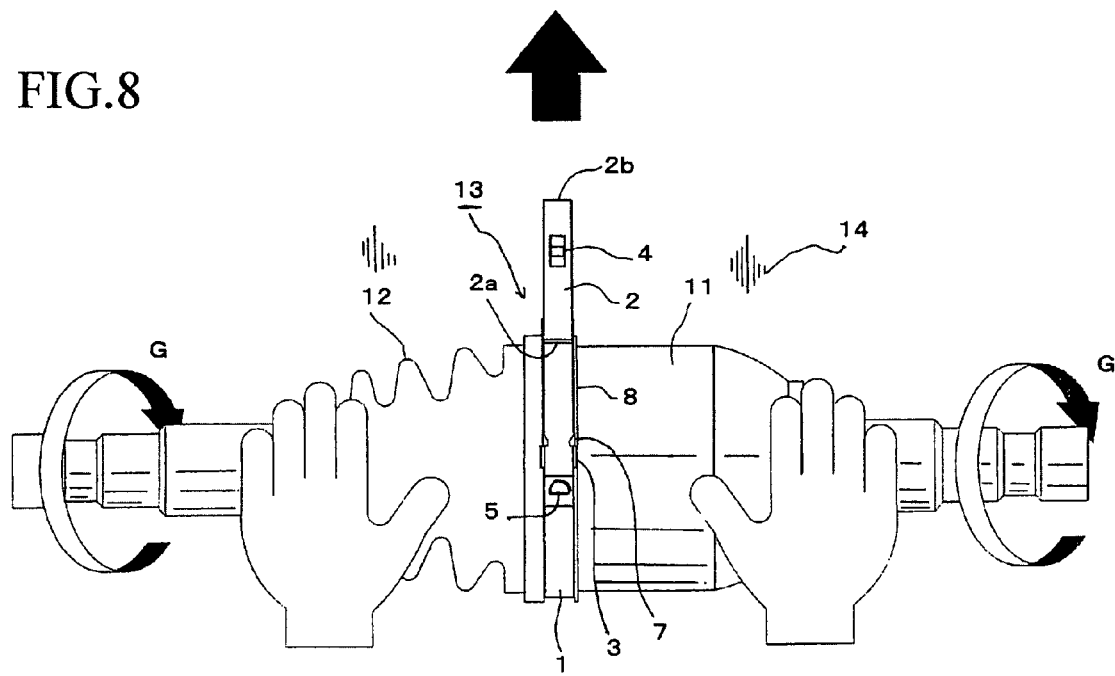
FIG. 8 is an explanation view of attaching the clamping band without tool.
Figure 9:
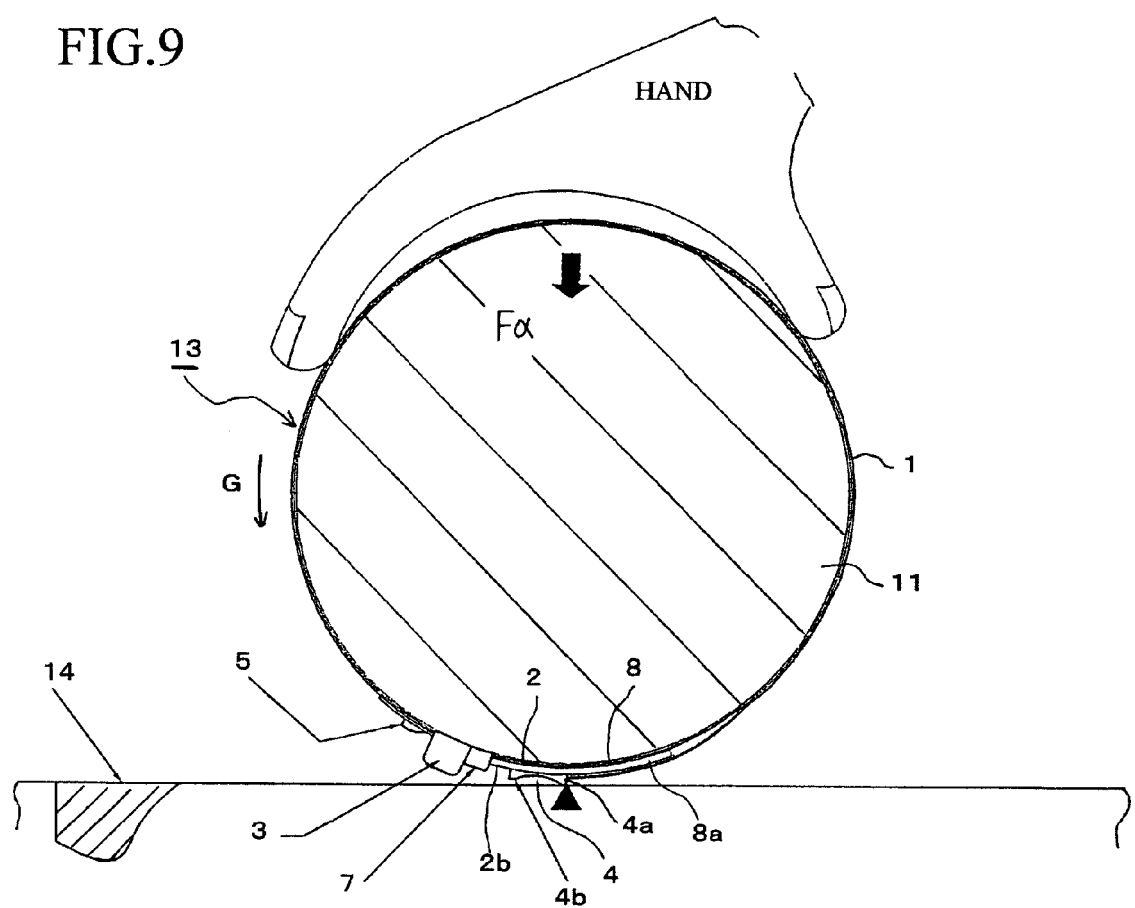
FIG. 9 is an explanation view of attaching the clamping band without tool.

Next, as shown in FIG. 8, the constant velocity joint 11 is pressed onto a surface of an external member 14 and rolled in a direction E so as to turn the lever 2, which has been temporarily bent, toward the outer circumferential face of the band member 1. At that time, as shown in FIG. 9, the band member 11 is rolled in a direction G and pressed onto the surface of the external member 14 by a pressing force Fα, which includes the weight of the constant velocity joint 11, so that the diameter of the band member 1 can be reduced. When the first projection 4a is pressed onto the surface of the external member 14, the first projection 4a acts as a fulcrum point, so that the lever action promotes to press the front end 2b of the lever 2 and the lever 2 can be received by the clipping members 7 in an early stage of rolling in the direction G. With this action, the lever 2 can be temporarily held by the clipping members 7 even if the lever 2 is short, so that buckling of the lever 2 can be prevented.

If the rotation of the clamping band 13 fitted to the constant velocity joint 11, in the direction G, is accelerated, the buckles 3 and the clipping members 7 are excessively pressed onto the surface of the external member 14, so that they will be damaged or deformed. To avoid this advantage, in the present embodiment, the first projection 4a firstly contacts the external member 14, then the second projection 4b secondly contacts the external member 14. Therefore, the second projection 4b prevents the rotation of the band member 13 in the direction G. As described above, the lever 2, which has been temporarily bent as shown in FIG. 6D, can be turned to reduce the diameter of the band member 1 without using the tool 9. Finally, the buckles 3 are bent inward so as to hold the front end 2b of the lever 2 by the hammer 14, so that the clamping band 13 clamps the boot 12 (FIG. 6E).

Since the diameter of the clamping band 13 can be reduced and the lever 2 can be temporarily held without using the tool 9, the clamping band 13 can be easily used, so that efficiency of clamping works can be improved. Note that, shapes and heights of the first projection 4a and the second projection 4b, and a distance therebetween may be optionally designed.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A clamping band, comprising:
    a band member having a first end and a second end, which are connected to form said band member into a ring-shape;
    a lever having one end, a mid part and the other end, said lever being fixed to the connected part of said band member at the mid part, wherein said lever is turned about the one end, which contacts said band member as a fulcrum point, until the other end contacts an outer circumferential face of said ring-shaped band member so as to reduce a diameter of said ring-shaped band member;
    buckles for holding said lever which has been turned and laid on the outer circumferential face of said ring-shaped band member, said buckles being respectively extended from both side edges of said band member;
    a first hook including a first projection, which can be engaged with a tool, and a second projection, which prevents rotation of said ring-shaped band member when said lever is pressed onto an external member, wherein the first projection and the second projection are outwardly projected from said lever, and they are arranged in that order toward the other end of said lever;
    a second hook for engaging with the tool, said second hook being outwardly projected from said band member and located close to a position on which said lever is laid; and
    a clipping member for clipping and holding said lever in a laid state, said clipping member being located close to said buckles.

2. The clamping band according to claim 1, wherein the first hook of said lever is located close to the connected part of said band member, and the second hook is located close to said buckles.

3. The clamping band according to claim 2, wherein the position of the first hook defines a welding point of said band member and said lever, and the position of the second hook defines a position of the other end of said lever which has been laid on said band member so as to reduce the diameter thereof.

4. The clamping band according to claim 1, wherein said band member is made of ferritic stainless steel, and said clipping member is made of austenitic stainless steel.

5. The clamping band according to claim 1, wherein a distance between inner faces of said buckles gradually increases toward radial outer ends of said buckles.

* * * * *